US011889972B2

(12) United States Patent
Langen et al.

(10) Patent No.: US 11,889,972 B2
(45) Date of Patent: Feb. 6, 2024

(54) METHOD FOR OPERATING A SUCTION DEVICE AND SUCTION DEVICE

(71) Applicant: Alfred Kärcher SE & Co. KG, Winnenden (DE)

(72) Inventors: Thorsten Langen, Stuttgart (DE); Michael Kaiser, Leutenbach (DE); Gábor Peflof, Winnenden (DE); Juergen Steinbach, Morbach (DE); Heiko Stoecker, Esslingen (DE)

(73) Assignee: Alfred Kärcher SE & Co. KG, Winnenden (DE)

(*) Notice: Subject to any disclaimer, the term of this patent is extended or adjusted under 35 U.S.C. 154(b) by 412 days.

(21) Appl. No.: 16/778,744

(22) Filed: Jan. 31, 2020

(65) Prior Publication Data

US 2020/0163517 A1    May 28, 2020

Related U.S. Application Data

(63) Continuation of application No. PCT/EP2018/071054, filed on Aug. 2, 2018.

(30) Foreign Application Priority Data

Aug. 3, 2017   (DE) ................. 10 2017 117 684.5

(51) Int. Cl.
*A47L 9/28* (2006.01)
*B01D 46/44* (2006.01)
(Continued)

(52) U.S. Cl.
CPC ............ *A47L 9/2889* (2013.01); *A47L 5/365* (2013.01); *A47L 9/1409* (2013.01);
(Continued)

(58) Field of Classification Search
CPC ........ A47L 9/1409; A47L 9/1472; A47L 9/19; A47L 9/2821; A47L 9/2842;
(Continued)

(56) References Cited

U.S. PATENT DOCUMENTS 4,733,430 A    3/1988  Westergren
4,733,431 A *  3/1988  Martin .................. A47L 9/1472
                                                      96/418
(Continued)

FOREIGN PATENT DOCUMENTS

DE    WO2015139751 A1 *  9/2015  ............... A47L 9/10
DE    WO2016112959 A1 *  7/2016  ........... A47L 9/0081
(Continued)

OTHER PUBLICATIONS

WO2015139751A1_ENG (Espacenet machine translation of Hensel) (Year: 2015).*

(Continued)

*Primary Examiner* — Gabriel E Gitman
(74) *Attorney, Agent, or Firm* — Womble Bond Dickinson (US) LLP

(57) ABSTRACT

A method is provided for operating a suction device that includes a suction unit and a removable filtering device. The suction unit generates a suction flow that flows through the filtering device when arranged on the suction device, in which, after the suction unit is started up, a check is performed of whether the filtering device is present, and if detected as not present, the suction unit is switched off. An evaluation unit uses check data to determine whether a switch-off signal is to be generated for the suction unit. The evaluation unit uses an algorithm or a table to arrive at a decision on switching off the suction unit based on the check data. The table contains at least one threshold value or the algorithm defines at least one threshold value, wherein the at least one threshold value is a threshold value for switching off the suction unit.

21 Claims, 1 Drawing Sheet

(51) Int. Cl.
*A47L 9/14* (2006.01)
*A47L 5/36* (2006.01)
*A47L 9/19* (2006.01)
*B01D 46/00* (2022.01)
*B01D 46/46* (2006.01)
*B01D 46/66* (2022.01)

(52) U.S. Cl.
CPC .............. *A47L 9/1472* (2013.01); *A47L 9/19* (2013.01); *A47L 9/2821* (2013.01); *A47L 9/2842* (2013.01); *B01D 46/0086* (2013.01); *B01D 46/444* (2013.01); *B01D 46/446* (2013.01); *B01D 46/46* (2013.01); *B01D 46/66* (2022.01); *B01D 2279/55* (2013.01)

(58) Field of Classification Search
CPC ... A47L 9/2889; A47L 5/365; B01D 46/0086; B01D 46/444; B01D 46/446; B01D 46/46; B01D 46/66; B01D 2279/55; G01R 33/07; B08B 15/00; B08B 15/002
See application file for complete search history.

(56) References Cited

U.S. PATENT DOCUMENTS

| 4,786,295 | A | * | 11/1988 | Newman | B01D 46/446 55/471 |
| 5,810,908 | A | * | 9/1998 | Gray | B01D 46/46 96/417 |
| 6,571,422 | B1 | | 6/2003 | Gordon et al. | |
| 2007/0163075 | A1 | | 7/2007 | Butler et al. | |
| 2007/0283521 | A1 | | 12/2007 | Foster et al. | |
| 2013/0019901 | A1 | | 1/2013 | Gerhards | |
| 2017/0000305 | A1 | * | 1/2017 | Gordon | A47L 5/30 |

FOREIGN PATENT DOCUMENTS

| EP | 2 636 351 | 9/2013 |
| EP | 2 598 008 | 3/2015 |
| JP | H03168117 | 7/1991 |

OTHER PUBLICATIONS

WO2016112959A1_ENG (Espacenet machine translation of Ebert) (Year: 2016).*

* cited by examiner

METHOD FOR OPERATING A SUCTION DEVICE AND SUCTION DEVICE

CROSS-REFERNCE TO RELATED APPLICATIONS

This application is a continuation of international application number PCT/EP2018/071054 filed on 2 Aug. 2018 and claims the benefit of German application number 10 2017 117 684.5 filed on 3 Aug. 2017, which are incorporated herein by reference in their entirety and for all purposes.

BACKGROUND OF THE INVENTION

The invention relates to a method for operating a suction device, said suction device comprising a suction unit and a removable filtering device, wherein the suction unit generates a suction flow that flows through the filtering device when this is arranged on the suction device, in which, after the suction unit is started up, a check is performed of whether the filtering device is present, and if it is detected that the filtering device is not present, the suction unit is switched off, wherein an evaluation unit uses check data and determines therefrom whether a switch-off signal is to be generated for the suction unit or not.

Further, the invention relates to a suction device, including a suction unit and a removable filtering device, wherein the suction unit generates a suction flow that flows through the filtering device when the filtering device is arranged on the suction device, a pressure sensor device that is arranged between the filtering device and the suction unit and provides pressure measured values of the suction flow downstream of the filtering device and upstream of the suction unit, and an evaluation unit that, after the suction unit is started up, determines on the basis of the measurement data of the pressure sensor device whether the filtering device is being used or not and, if it is detected that there is no filtering device, generates a switch-off signal for the suction unit.

EP 2 598 008 B1 discloses a vacuum cleaner having a receiving chamber for a main filter, having a pressure sensor system for detecting a variable that characterizes a negative pressure in a first region downstream of the receiving chamber, as seen in a suction flow direction, having a detection unit that, in dependence on the detected variable, detects whether a main filter is being used, and having a control unit that prevents the vacuum cleaner from being started up and/or outputs an item of heat information to a person operating the vacuum cleaner if it is detected that no main filter is being used. The pressure sensor system includes at least one pressure switch that transfers an output signal to the detection unit if the negative pressure in the first region is above a predeterminable negative pressure threshold value, and the detection unit detects that no main filter is being used if no output signal is received from the pressure switch.

US 2007/0283521 A1 discloses a programmable control unit for a vacuum cleaner system.

US 2007/0163075 A1 discloses a vacuum cleaner.

JP 03168117 A discloses a vacuum cleaner with an automatic stop function.

DE 10 2011 052 020 A1 discloses a vacuum cleaner with an arrangement for detecting a quantity of a flow rate that is generated during operation and/or an arrangement for detecting a quantity of a negative pressure that is generated during operation, wherein a drive unit controller includes arrangements for comparing the detected flow rate and a predetermined or predeterminable flow rate upper limit and/or arrangements for comparing the detected negative pressure and a predetermined or predeterminable negative pressure limit, and the drive unit controller includes or controls arrangements for reducing the electrical power consumption in dependence on the result of the comparison.

SUMMARY OF THE INVENTION

In accordance with the invention, a method is provided by means of which the suction device can be operated safely.

In accordance with an embodiment of the invention, the evaluation unit uses an algorithm or a table to arrive at a decision on switching off the suction unit based on the check data, and in that the table contains at least one threshold value or the algorithm defines at least one threshold value, wherein the at least one threshold value is a threshold value for switching off the suction unit.

A filtering device used on the suction device prevents dust that is drawn in by suction from being blown out into the surroundings. In principle, the filtering device may be clogged by dust particles. Cases have been known in which, in such a case, persons operating the suction device remove the filtering device from it and then continue to operate the suction device without a filtering device.

This has the result that dust particles are blown into the surroundings. This is particularly critical when working with dust that is hazardous to health.

If no filtering device is used, dust particles may reach the suction unit and be deposited there.

Further, in particular if the filtering device additionally has the function of providing sealing, the suction operation may be markedly limited, since as a result of the lack of sealing by the filtering device the entire suction power is no longer available (because leakage air is drawn in).

With the solution according to the invention, after the suction device is started up a check is performed of whether the filtering device is actually present, and if the check result indicates that it is not present the suction unit is switched off. This in particular prevents dust particles from being blown out into the air in the room.

As a result of checking after the suction unit is started up, it is possible for the corresponding checking device to take a structurally simple form. The number of parts required for this can be kept small. In particular, parts that are in any case already present can be used for the check. There is no need to modify the filtering device.

An evaluation unit is is provided that uses check data and determines from these whether a switch-off signal is to be generated for the suction unit or not. It is thus possible to carry out a detection check for the filtering device in a simple manner. The check data in particular include pressure measured values at an exhaust line between the filtering device and the suction unit. Further, an electrical voltage of an energy source for the suction unit may for example also be taken into account. For example, it is also possible for an electrical power consumption for the suction unit moreover to be taken into account.

The evaluation unit uses an algorithm or a table to arrive at a decision on switching off the suction unit, based on the check data. As a result, the corresponding check method can take a simple form. The number of hardware components (such as switches and lines) can be kept small.

The table contains at least one threshold value, or the algorithm defines at least one threshold value, wherein the at least one threshold value is a threshold value for switching off the suction unit, and is in particular a pressure value, wherein switching off of the suction unit is preferably performed in the event of an absolute pressure value that is too high in relation to the threshold value. Too high an absolute pressure value, or too small a pressure difference in relation to the ambient pressure, is an indication of there being no filtering device.

It is favorable if there is a delay of a defined time interval after the suction unit is started up before check results are used for switching off or continuing to operate the suction unit. The defined time interval is defined such that stable values used for the check can be established, and in particular stable pressure values can be established. Here, the time interval is selected to be at least long enough for these particular stable values to be established, and is preferably selected to be short enough for the duration of starting up the suction device to be minimized in relation to detecting the fact that there is no filtering device.

It has been found that the defined time interval should be at least 2.5 s and preferably at least 3 s and in particular at least 3.5 s. For example, this defined time interval is 4 s or 5 s. The defined time interval is also at least approximately the time interval that represents the maximum operating duration of the suction unit if it is detected that there is no filtering device.

It is favorable from a structural point of view if the check for the presence of the filtering device is carried out on the suction flow. This allows reliable detection of whether or not a filtering device is present to be carried out at minimal structural cost.

In particular, pressure values measured on the suction flow between the filtering device and the suction unit form the basis of the check. These measured pressure values can be used to enable whether the filtering device is present or not to be detected.

Here, it is favorable if the pressure measured values are determined at one or more locations in relation to the suction flow above a holder for the filtering device, wherein these locations are above the filtering device when the filtering device is inserted into the holder. In particular, the corresponding measurement is made at an exhaust line that connects the filtering device to the suction unit in a flow-efficient manner. In one embodiment, it is provided for the location or locations at which pressure measured values are determined to lie outside a region in which a cleaning-off device acts on the filtering device. The cleaning-off device, such as an external air valve device, can be used to clean off a clogged filter in order to obtain better throughflow capability. The corresponding position of the pressure sensor device can prevent a clean-off action that makes use of mechanical forces and/or pressure pulses on the filtering device from impacting at least directly on the pressure sensor device.

It has proved favorable if, for the purpose of checking for the presence or absence of the filter, furthermore an electrical voltage of an energy source is used for the suction unit. If for example the electrical energy source for the suction unit is a public electricity grid, there may be fluctuations in voltage. It has been found that if these fluctuations in voltage are taken into account, better detection of the presence or absence of the filtering device is made possible.

The evaluation unit is connected to a controller for the suction unit in a manner allowing signaling, or is part of this controller. This produces a simple structural arrangement. In particular, the evaluation unit is formed, at least for the most part, by software within the controller.

Favorably, the evaluation unit uses an algorithm or a table to arrive at a decision on switching off the suction unit based on the check data. This allows the corresponding check method to take a simple form.

It is favorable if the table contains at least one threshold value, or the algorithm defines at least one threshold value, wherein the at least one threshold value is a threshold value for switching off the suction unit, and is in particular a pressure value, wherein switching off of the suction unit is preferably performed in the event of an absolute pressure value that is too high in relation to the threshold value. Too high an absolute pressure value, or too small a pressure difference in relation to the ambient pressure, is an indication of there being no filtering device.

It has proved favorable if the table includes threshold values at different electrical voltages of an (electrical) energy source for the suction unit, or the algorithm defines threshold values at such different electrical voltages. It has been found that in this way for example it is also possible to detect fluctuations in voltage in an electricity supply network, with the result that such fluctuations in voltage do not in turn affect detection of the filter.

Moreover, it has been found favorable if the table includes threshold values for different power consumptions of the suction unit, or the algorithm includes such threshold values for different power consumptions of the suction unit, or the algorithm defines such threshold value for different powers of the suction unit, and in particular performs a classification into a minimum power consumption and maximum power consumption of the suction unit. This produces a broad range of application for detecting a filter. In particular, it is then possible to achieve a check of this kind largely independently of the attached equipment (in particular suction hoses). For example, it has been found that it is then possible to predetermine threshold values that are largely independent of the diameter of an attached suction hose.

In one embodiment, threshold values are determined from measurements in which suction hoses of different diameters are attached to the suction device and pressure measured values are measured with the filtering device used and without using the filtering device. A threshold value with the "lowest common denominator" is then determined from measured values of this kind.

In this case, it has been found favorable if, when the threshold values are determined, different electrical voltages of an energy source for the suction unit are used in order to enable the effect of fluctuations in voltage to be determined and where appropriate taken into account.

For the same reason, it is favorable if, when the threshold values are determined, different power consumptions are used for the suction unit and in particular a minimum power consumption and a maximum power consumption are used. This gives threshold values that may, at least to a certain extent, be dependent on the power consumption.

In one embodiment, using a filtering device has the function of providing sealing at a transition to a dirt collecting container. This has an effect on the threshold value. If there is no filtering device, fault currents and so on may arise. This has the result that by comparison with using a filtering device the negative pressure in the suction flow is reduced, or the absolute pressure value is closer to the ambient pressure.

Moreover, it is possible for the evaluation unit to initiate measures based on the determined check data if the presence of a filtering device is detected. When the presence of a filtering device is detected, the suction unit can continue to be operated. In that case, measures of this kind include: initiation of cleaning off the filtering device by a cleaning-off device and/or generation of a maintenance signal when a flow rate falls below a threshold value. If for example a course of pressure is then measured over time, it is possible for example to detect clogging of the filtering device with dust particles over time. The filter can then be cleaned off as needed, for example when a threshold value is reached. Moreover, it is possible for example to generate a maintenance signal that indicates another problem, such as closure of the suction hose, if a flow rate falls below a threshold value, this always being determinable from the pressure measured values.

According to an embodiment of the invention, the evaluation unit includes a storage device that stores threshold values or data for an algorithm for threshold values, wherein the threshold values are threshold values for switching off the suction unit.

This suction device has the advantages already explained in connection with the method according to the invention.

Further advantageous configurations of the suction device according to the invention have already been explained in connection with the method according to the invention.

In particular, the evaluation unit includes a timing element that ensures that a switch-off signal only becomes effective once a defined time interval after starting up the suction unit has elapsed. The defined time interval is in particular stored in the evaluation unit and was preferably defined or set at the factory.

The evaluation unit includes a storage device that stores threshold values or data for an algorithm for threshold values, wherein the threshold values are in particular pressure values. This allows filter detection to be carried out in a simple manner. The number of hardware components can be kept small. In particular, there is no need for a pressure switch with corresponding lines. A considerable proportion of elements for the determination can be in software form.

It is further favorable if the evaluation unit includes a device for determining an electrical voltage of an electrical energy source for the suction unit. This for example allows fluctuations in voltage in a public supply grid to be taken into account, and the detection of a filter can be carried out reliably despite the possibility of fluctuations.

Further, it may be provided for the evaluation unit to include a device for defining a power consumption of the suction unit, and in particular to classify the power consumption into a maximum power consumption or a minimum power consumption. This gives a reliable detection result.

In particular, the evaluation unit is connected to a controller of the suction device (which is also a controller for the suction unit) in a manner allowing signaling, or is part of this controller. This allows checking for the presence of the filtering device to be integrated into the controller of the suction device.

The suction device according to the invention can be used for carrying out the method according to the invention, or the method according to the invention can be carried out on the suction device according to the invention.

The description below of preferred embodiments of the invention serves, together with the drawings, to explain the invention in more detail.

DETAILED DESCRIPTION OF THE INVENTION

Figure 1:
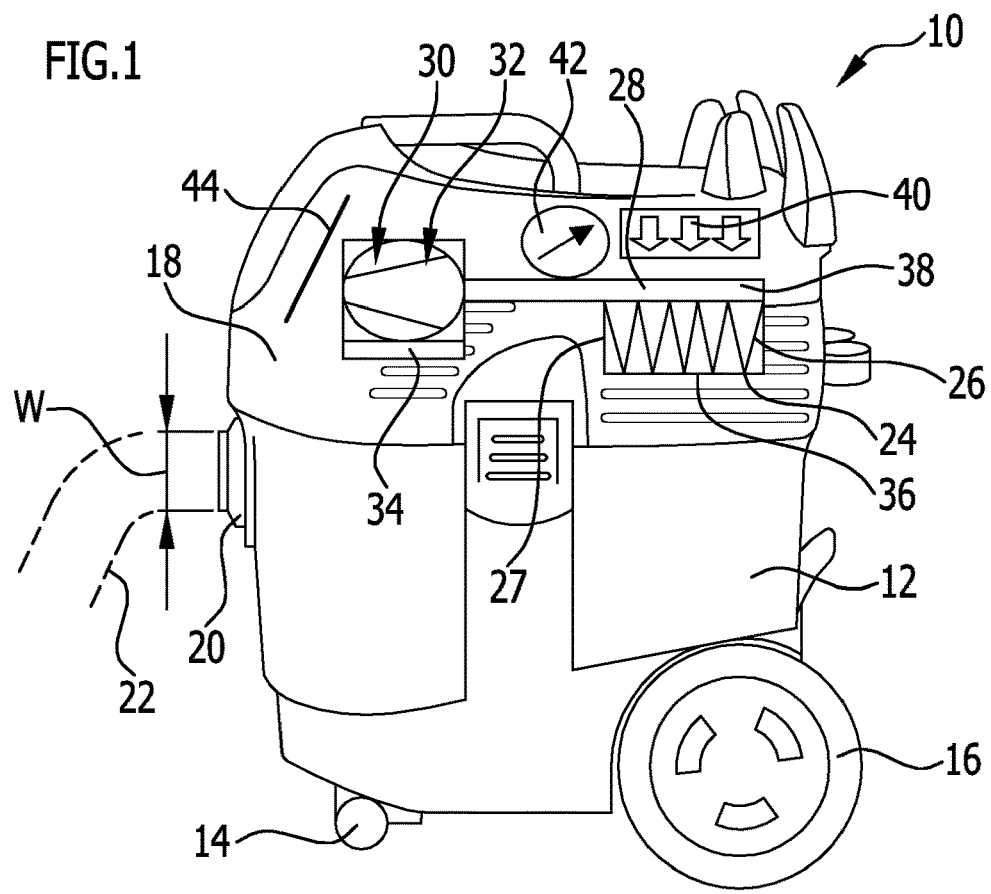
FIG. 1 is a schematic illustration of an exemplary embodiment of a suction device according to the invention.

An exemplary embodiment of a suction device 10 according to the invention is a vacuum cleaner in the form of a stand-alone device. This suction device 10 has a dirt collecting container 12. It is provided for the dirt collecting container 12 and hence the suction device 10 as a whole to be configured to be set up such that they are rollable on a base by way of a steering roller 14 and a wheel device 16.

A detachable suction head 18 is set up on the dirt collecting container 12.

For example, there is arranged on the dirt collecting container 12 a suction inlet 20. In an alternative embodiment, the suction inlet 20 is arranged on the suction head 18. A suction hose 22 is attachable to this suction inlet 20; in a suction operation of the suction device 10, aspirated material is drawn in through an attached suction hose 22 (on which a nozzle is also where appropriate seated).

If the suction head 18 is seated on the dirt collecting container 12, it seals this off at the upper side. It has a suction outlet 24 at which a filtering device 26 having a (at least one) filter is positioned on a filter holder 27. The filter holder 27 for example takes an embracing form or takes the form of a baseplate.

Adjoining the filtering device 26 there is an (at least one) exhaust line 28. The exhaust line 28 leads to a suction unit 30. The suction unit 30 includes a fan device 32 having an (at least one) impeller and a drive motor 34 for motorized driving of the impeller of the fan device 32. The drive motor 34 is in particular an electric motor, such as a universal motor.

The exhaust line 28 and the suction unit 30 are arranged in the suction head 18.

In the embodiment described, the filtering device 26 is arranged in the suction head 18.

In principle, it is also possible for the filtering device 26 to be arranged on the dirt collecting container 12.

By way of the fan device 32, the suction unit 30 generates a suction flow that acts by way of the exhaust line 28 on the dirt collecting container 12 and the suction inlet 20. When the suction device 10 is in suction flow operation, the suction flow passes through the filtering device 26. Under the action of the suction flow and by way of the suction inlet 20, air loaded with dirt particles enters the dirt collecting container 12, and the particles can be collected in the dirt collecting container 12. The filtering device 26 filters dirt particles out. Accordingly, it has a dirty side 36 facing the dirt collecting container 12 and a clean side 38 attached to the exhaust line 28.

(Cleaned) suction air can be discharged to the surroundings by the suction unit 30 via outgoing air openings.

In one exemplary embodiment, a cleaning-off device 40 is associated with the filtering device 26. The cleaning-off device 40 is arranged in the suction head 18 such that it is configured to act on the filtering device 26 for a cleaning-off procedure. Solid particles are deposited on the filter of the filtering device 26. The cleaning-off device 40 allows such solid particles to be detached, in order to improve the filter action of the filtering device 26.

In one exemplary embodiment, the cleaning-off device 40 is an external air valve device that acts on the filtering device 26 with air jets to obtain a clean-off effect.

In principle, the filtering device 26 is removable from the filter holder 27 and hence from the suction device 10, for example to make it possible to replace the filter.

When the filtering device 26 is used in the suction device 10—that is to say, in the exemplary embodiment described, is inserted in the suction head 18—and the suction head 18 is positioned on the dirt collecting container 12 and is in particular locked thereon, the filtering device 26 has a sealing function; the suction flow can only flow through filter material of the filter of the filtering device 26 from the dirt collecting container 12 and into the exhaust line 28.

Arranged on the exhaust line 28, between the filtering device 26 and the fan device 32, there is a (at least one) pressure sensor 42 of a pressure sensor device. This pressure sensor 42 allows the pressure in the suction flow downstream of the filtering device 26 to be measured. The pressure prevailing in the exhaust line 28 can be determined.

In one exemplary embodiment, the pressure sensor 42 is arranged such that it does not lie in a region in which the cleaning-off device 40 acts on the filtering device 26. If for example the cleaning-off device 40 is an external air valve device, then preferably the pressure sensor 42 is arranged such that it is not acted upon, at least not directly, by air jets of the cleaning-off device 40.

The suction device 10 has a controller 44 that controls operation of the suction device 10. This controller 44 includes one or more circuit boards on which electronic elements are arranged. The controller 44 is in particular positioned in the suction head 18.

In principle, the suction device 10 can be operated without a filtering device 26. However, this has the result that solid particles that are drawn in by suction are blown back into the surroundings. Moreover, relatively large quantities of solid particles can pass into the exhaust line 28 and reach the fan device 32 and cause damage. Operation of the suction device 10 without the filtering device 26 is particularly critical when working with dust that is hazardous to health.

According to the invention, it is provided for it to be automatically detected at the suction device 10 whether a filtering device 26 is being used or not, and if the fact that there is no filtering device 26 is detected then (prolonged) operation of the suction device 10 is prevented.

Figure 2:
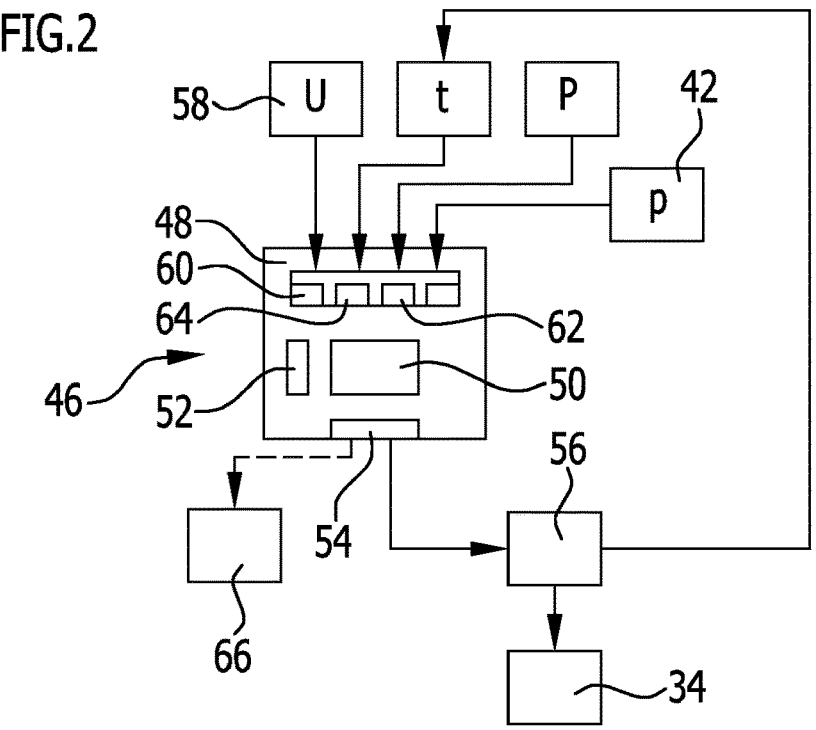
FIG. 2 is a schematic illustration of an exemplary embodiment of an evaluation unit for the suction device in FIG. 1 (in the form of a block circuit diagram).

In one exemplary embodiment, the controller 44 includes an evaluation unit 46 (FIG. 2). Here, the evaluation unit 46 is in particular integrated into the controller 44.

In principle, it is also possible for the evaluation unit 46 to be spaced from the controller 44 and to cooperate with the controller 44 in a manner allowing signaling.

Various data are provided to the evaluation unit 46. For this purpose, the evaluation unit 46 has a corresponding (input) interface 48. A checking device 50 of the evaluation unit 46 uses the data provided to check whether the filtering device 26 is present or not.

For this purpose, the checking device 50 applies one or more algorithms or accesses a table stored in a storage device 52.

Further, the evaluation unit 46 includes an (output) interface 54. This interface 54 in particular controls the suction unit 30 and at the same time the drive motor 34, directly or indirectly. For example, the interface 54 generates a corresponding switch-off signal that is transmitted to a switch 56 (in particular of the controller 44) in order to be able to switch off the suction unit 30 if it is detected that there is no filtering device 26.

The pressure sensor 42 of the pressure sensor device provides its measured values to the evaluation unit 46. On the basis of the measured pressure values, the evaluation unit 46 then checks whether the filtering device 26 is present or not.

The drive motor 34 is provided with electrical energy via an electrical energy source 58. In principle, fluctuations in voltage may occur at the electrical energy source 58.

For a mains-operated suction device 10, the primary electrical energy source 58 is, for example, a public electricity grid. Fluctuations in voltage may occur in a public electricity grid of this kind. It has been found that such fluctuations in voltage may in principle have an effect.

In one exemplary embodiment, the evaluation unit 46 includes a device 60 for determining this electrical voltage specifically in order to be able to take into account any deviations from a rated voltage (such as 230 V).

The determining device 60 determines the voltage that is actually operative, in particular for the drive motor 34.

It is likewise possible in principle for an electrical power consumption of the suction unit 30 to affect the check. In one exemplary embodiment, the evaluation unit 46 includes a device 62 for defining a corresponding power consumption P. Here, it is provided in particular for the electrical power consumption to be classified into certain ranges, and in particular into a minimum power consumption at which a suction operation is still possible and a maximum power consumption.

The maximum power consumption is the maximum power that the fan device 32 can draw with an open reference suction hose of a defined length and a defined diameter.

In order to check whether the filtering device 26 is present or not, the suction device 10 must be operated—that is to say the suction unit 30 must be switched on. In one exemplary embodiment, the evaluation unit 46 includes a timing element 64. This timing element 64 measures the time that has elapsed since the suction unit 30 was started up. It has been found that there must be a delay of a defined time interval before check results can be determined, or before check results can be meaningfully used where appropriate to switch the suction unit 30 off again.

In particular, this defined time interval is predetermined. It is for example at least 2.5 s and preferably at least 3 s and particularly preferably at least 3.5 s. In a concrete exemplary embodiment, this defined time interval is 4 s or 5 s.

The method according to the invention for operating the suction device 10 and at the same for detecting whether a filtering device 26 is present or not functions as follows:

When the suction device 10 is started up, the suction unit 30 is started up. A suction flow is generated, and this acts by way of the exhaust line 28 on the dirt collecting container 12, the suction inlet 20 and a suction hose 22 attached thereto.

The check is carried out, wherein there is a delay of the defined time interval before the check is carried out or check results are used to switch off in particular the suction unit 30

(if it is detected that there is no filtering device 26). Here, the timing element 64 checks whether this defined time interval has elapsed yet or not.

The measured values of the pressure sensor 42 are used for the check.

Here, a check is made of whether the pressure falls below a defined threshold or not. This threshold value for the pressure may in principle be calculated using one or more algorithms, or it may be stored in a table, in particular in the storage device 52.

When the filtering device 26 is being used, then, with a defined hose diameter W of the suction hose 22, a predetermined voltage U and a defined power consumption P, an approximately constant pressure is established in the exhaust line 28 that is measurable by way of the pressure sensor 42. This pressure is a negative pressure in relation to the ambient pressure.

When the filtering device 26 is not being used, then a pressure value is likewise established, different from the pressure value with the filtering device 26 present. Conventionally, the absolute pressure value when the filtering device 26 is not present is greater than when the filtering device 26 is present, since in the absence of a filtering device 26 there is no sealing effect of the filtering device 26 on the suction head 18, and so bypass channels for leakage air are erroneously opened up.

In relation to absolute pressure values, it is then possible, as a result of the fact that a predetermined threshold value as the absolute pressure value is exceeded, to detect that no filtering device 26 is present. If, as the differential pressure in relation to ambient pressure, too low a negative pressure (a negative pressure below a threshold value) is determined, then this is a detection result for the absence of a filtering device 26—a result that leads to switching off the suction unit 30.

In particular, threshold values are then stored in the storage device 52 in table form, with their relationship to U and P.

The threshold values are previously determined for a specific suction device 10 and stored in the storage device 52 in table form, or a corresponding algorithm is provided for this purpose.

In one exemplary embodiment, the pressure values at the pressure sensor 42 were measured for different voltages (230 V, 207 V and 254 V) with different hose diameters W for a specific suction device 10 at a room temperature of 20° C. in order to determine threshold values. During this, first the filtering device 26 was used and then it was omitted.

Further, during this the suction unit 30 was operated as described above, at the minimum power consumption P and the maximum power consumption P. This gave the following measured values:

TABLE 1

| | U = 230 V: | | | |
|---|---|---|---|---|
| Hose diameter W [mm] | Negative pressure [mbar] Max power P with filtering device | Negative pressure [mbar] Max power P without filtering device | Negative pressure [mbar] Min power P with filtering device | Negative pressure [mbar] Min power P without filtering device |
| 50 | 41 | 10 | 20 | 6 |
| 40 | 58 | 12 | 28 | 7 |
| 35 | 67 | 13 | 34 | 7.5 |
| 32 | 75 | 13.5 | 39 | 7.9 |
| 27 | 104 | 16 | 58 | 9.3 |
| 21 | 160 | 20.6 | 89 | 11.4 |

TABLE 2

| | U = 207 V: | | | |
|---|---|---|---|---|
| Hose diameter W [mm] | Negative pressure [mbar] Max power P with filtering device | Negative pressure [mbar] Max power P without filtering device | Negative pressure [mbar] Min power P with filtering device | Negative pressure [mbar] Min power P without filtering device |
| 50 | 37 | 8.4 | 19.4 | 4.8 |
| 40 | 52 | 9.9 | 27 | 8 |
| 35 | 64 | 11.3 | 34 | 6.2 |
| 32 | 67 | 11.8 | 35 | 6.5 |
| 27 | 92 | 14.4 | 51 | 7.7 |
| 21 | 137 | 18.5 | 76 | 9.6 |

TABLE 3

| | U = 254 V: | | | |
|---|---|---|---|---|
| Hose diameter W [mm] | Negative pressure [mbar] Max power P with filtering device | Negative pressure [mbar] Max power P without filtering device | Negative pressure [mbar] Min power P with filtering device | Negative pressure [mbar] Min power P without filtering device |
| 50 | 49 | 11.2 | 26.5 | 6.3 |
| 40 | 67 | 13.7 | 37 | 7.5 |
| 35 | 81 | 15.3 | 46 | 8.4 |
| 32 | 87 | 15.5 | 49 | 8.5 |
| 27 | 123 | 18.9 | 69 | 10.2 |
| 21 | 184 | 24 | 103 | 12.9 |

The negative pressure stated in the table is the pressure difference from the ambient pressure. The absolute pressure is consequently the differential ambient pressure minus the negative pressure.

The different voltage values are characteristic of a rated voltage (230 V), a marked undervoltage and a marked overvoltage. In practice, it has been found that for mains-operated suction devices 10 a categorization of this kind is sufficient.

It can be seen from the tables that when the filtering device 26 is present the negative pressure is greater than without a filtering device 26. This means that with a filtering device 26 the absolute pressure is lower than when there is no filtering device 26.

The relationship to the voltage U and the power consumption P can further be seen from these tables.

It can further be seen (as expected) that as the hose diameter becomes smaller the negative pressure increases—that is to say that the absolute pressure falls.

It is provided for the threshold values that are stored in particular in the storage device 52 in table form to be defined such that the hose diameter W is ignored, with the result that to a certain extent they are universal for the suction device 10, independently of the suction hose 22 used.

A corresponding table of threshold values is then generated from the measured results using threshold values that apply to all hose diameters W:

TABLE 4

| U | $p_T$ (max power) | $p_T$ (min power) |
|---|---|---|
| 207 | 27 | 14 |
| 230 | 30 | 15 |
| 254 | 36 | 19 |

Here, the pressure $p_T$ is the corresponding threshold value pressure, presented in the table shown as a negative pressure. As mentioned above, the corresponding threshold value in relation to absolute pressure values is the difference between ambient pressure and $p_T$.

The corresponding threshold values are stored in table form for the maximum power consumption and the minimum power consumption. Further, they are stored for the respective voltage U of the electrical energy source 58, wherein a categorization is in particular performed here too. (Typically, it is sufficient to classify the voltage U into a few ranges, such as three ranges.)

Using this table of threshold values, the evaluation unit 46 is then used to check whether a switch-off signal is to be generated for the suction unit 30 or not.

Moreover, the table below shows, for different hose diameters, how long the time is between starting up the suction unit 30 and the establishment of stable pressure values at the pressure sensor 42, for different hose diameters W, with a filtering device 26 and without a filtering device 26:

TABLE 5

| | Time [s] | |
|---|---|---|
| Hose diameter W [mm] | With filtering device, open | Without filtering device, open |
| 21 | 2.75 | 0.83 |
| 27 | 2.05 | 1.48 |
| 32 | 2.35 | 1.31 |
| 35 | 2.37 | 1.03 |
| 40 | 2.03 | 1.11 |
| 51 | 1.06 | 1.13 |

From these measured values, it is possible to establish the defined time interval that is used for the release of check results, or for carrying out the check that can result in switching off. It can be seen from the table that, for example, a delay of approximately 3 seconds is sufficient to obtain stable pressure conditions in all conditions (with a filtering device 26, without a filtering device 26, different hose diameters W). If in this case a safety margin of 1 s or more is for example moreover set, then the defined time interval after which a switch-off signal for the suction unit 30 can as a general rule be generated may be established as (at least) 4 s.

Tables 1 to 3 and 5 are "calibration tables", which are used to establish parameters required for operating the suction device 10 (threshold values for pressure, defined time interval for meaningful check). The values in Table 4 are stored in the storage device 52. The duration determined from the data in Table 5 for the defined time interval is likewise stored at the evaluation unit 46 (and therein for example in the storage device 52).

By measuring the pressure at the pressure sensor 42 above the filtering device 26 and, downstream of the filtering device 26, upstream of the fan device 32, it is possible to reliably detect whether the filtering device 26 is being used or not. Taking into account the actual voltage of the electrical energy source 58 and where appropriate also the power consumption of the suction unit 30 enables this detection to be improved.

A delay of a defined time interval after the suction unit 30 has started up before check results are used makes it possible to ensure that a "run-in" period directly after the suction unit 30 starts up has come to an end.

It has been found that a reliable check is produced even if suction hoses 22 of different diameters are used. This makes it possible to carry out the check of whether the filtering device 26 is present in a manner independent of equipment.

The effect of the structural cost of this check on the suction unit 30 is minimized.

This makes it possible to prevent the suction device 10 from being operated with no filter device 26 for long periods. In principle, it makes it possible to ensure that, with no filtering device 26, the suction device 10 is operated at most for the defined time interval (for example 4 s).

If a filtering device 26 is detected, then the results of detection from the pressure sensor 42 can also be used for other measures (indicated by the reference numeral 26 in FIG. 2). Such measures are for example cleaning off the filter of the filtering device 26 as needed by controlling the cleaning-off device 40 appropriately. For example, a gradual increase in pressure in the exhaust line 28 (increase in absolute pressure; reduction in negative pressure) may be interpreted as a gradual clogging of the filtering device 26, and when a threshold is reached it is then possible to initiate cleaning off of the filter by the cleaning-off device 40.

Further, for example a flow rate may be derived from the pressure measured values, and a maintenance signal may be generated if a flow rate falls below a threshold value.

According to the invention, a suction device 10 is provided in which, at little structural cost, it is possible to detect that the filtering device 26 is present. It is ensured that when the absence of a filtering device 26 is detected, further operation is not possible. This prevents dust from being blown into the ambient area by the suction device 10.

LIST OF REFERENCE NUMERALS

10 Suction device
12 Dirt collecting container
14 Steering roller
16 Wheel device
18 Suction head
20 Suction inlet
22 Suction hose
24 Suction outlet
26 Filtering device
27 Filter holder
28 Exhaust line
30 Suction unit
32 Fan device
34 Drive motor
36 Dirty side
38 Clean side
40 Cleaning-off device
42 Pressure sensor
44 Controller
46 Evaluation unit
48 (Input) interface
50 Checking device
52 Storage device
54 (Output) interface
56 Switch
58 Electrical energy source
60 Determining device for electrical voltage
62 Defining device
64 Timing element
66 "Measures"

The invention claimed is:

1. A method for operating a suction device, said suction device comprising a suction unit, a controller implementing an evaluation unit, and a removable filtering device, wherein the suction unit generates a suction flow that flows through the filtering device when said filtering device is arranged on the suction device, said method comprising:
after the suction unit is started up, performing a check whether the filtering device is present, the check comprising:
accessing, by the evaluation unit, check data stored in a table of a storage device of the evaluation unit, or using, by the evaluation unit, an algorithm to compute the check data, the check data containing at least one threshold value or the algorithm defining the at least one threshold value, wherein the at least one threshold value includes a threshold value for switching off the suction unit, and wherein the at least one threshold value is a pressure value;
comparing, by the evaluation unit, an absolute pressure value to the pressure value;
generating and transmitting a switch-off signal from the evaluation unit to a switch of the controller if the absolute pressure value exceeds the pressure value thereby indicating that the filtering device is not present; and
switching off the suction unit,
wherein the pressure value is determined from measurements in which suction hoses of different diameters are attached to the suction device and the pressure value measurements are measured with the filtering device used and without using the filtering device.

2. The method according to claim 1, wherein there is a delay of a defined time interval after the suction unit is started up before the check data are used for switching off or continuing to operate the suction unit.

3. The method according to claim 2, wherein the defined time interval is at least 2.5 s.

4. The method according to claim 1, wherein the check for the presence of the filtering device is carried out on the suction flow.

5. The method according to claim 1, wherein pressure values measured on the suction flow between the filtering device and the suction unit form the basis of the check.

6. The method according to claim 5, wherein the measured pressure values are determined at one or more locations in relation to the suction flow above a holder for the filtering device, wherein the location or locations is/are above the filtering device when the filtering device is inserted into the holder for the filtering device.

7. The method according to claim 5, wherein the location or locations at which the measured pressure values are determined lie outside a region in which a cleaning-off device acts on the filtering device.

8. The method according to claim 5, wherein, for the purpose of checking, furthermore an electrical voltage of an energy source is used for the suction unit.

9. The method according to claim 1, wherein the evaluation unit is connected to the controller for the suction unit in a manner allowing signalling, or is part of the controller.

10. The method according to claim 1, wherein the table includes threshold values at different electrical voltages of an energy source for the suction unit, or the algorithm defines threshold values at such different electrical voltages.

11. The method according to claim 1, wherein the table includes threshold values for different power consumptions of the suction unit, or the algorithm defines such threshold values for different powers of the suction unit, and in particular performs a classification into a minimum power consumption and maximum power consumption of the suction unit.

12. The method according to claim 1, wherein, when the at least one threshold value is determined, different electrical voltages of an energy source for the suction unit are used.

13. The method according to claim 1, wherein, when the at least one threshold value is determined, different power consumptions are used for the suction unit and in particular a minimum power consumption and a maximum power consumption are used.

14. The method according to claim 1, wherein the filtering device has a sealing function at a transition to a dirt collecting container.

15. The method according to claim 1, wherein the evaluation unit initiates measures based on the check data used for the determining if the presence of a filtering device is detected, wherein these measures may include at least one of:
   an initiation of cleaning off the filtering device by a cleaning-off device; and
   a generation of a maintenance signal when a flow rate falls below a threshold value.

16. A suction device, comprising
   a suction unit;
   a controller;
   a removable filtering device,
   wherein the suction unit generates a suction flow that flows through the filtering device when the filtering device is arranged on the suction device;
   a pressure sensor device that is arranged between the filtering device and the suction unit and provides pressure measured values of the suction flow downstream of the filtering device and upstream of the suction unit; and
   an evaluation unit implemented by the controller that, after the suction unit is started up, the evaluation unit is configured to perform a check whether the filtering device is present, the check comprising:
      accessing, by the evaluation unit, check data stored in a table of a storage device of the evaluation unit, or using, by the evaluation unit, an algorithm to compute the check data, the check data containing at least one threshold value or the algorithm defining the at least one threshold value, wherein the at least one threshold value includes a threshold value for switching off the suction unit, and wherein the at least one threshold value is a pressure value;
      comparing, by the evaluation unit, an absolute pressure value to the pressure value:
      generating and transmitting a switch-off signal from the evaluation unit to a switch of the controller if the absolute pressure value exceeds the pressure value thereby indicating that the filter device is not present,
   wherein the pressure value is determined from measurements in which suction hoses of different diameters are attached to the suction device and the pressure value measurements are measured with the filtering device used and without using the filtering device.

17. The suction device according to claim 16, wherein the evaluation unit includes a timing element that ensures that the switch-off signal only becomes effective once a defined time interval after starting up the suction unit has elapsed.

18. The suction device according to claim 16, wherein the at least one threshold value is a pressure value.

19. The suction device according to claim 16, wherein the evaluation unit includes a device for determining an electrical voltage of an electrical energy source for the suction unit.

20. The suction device according to claim 16, wherein the evaluation unit includes a device for defining a power consumption of the suction unit, and in particular classifies the power consumption into a maximum power consumption or a minimum power consumption.

21. The suction device according to claim 16, wherein the evaluation unit is connected to the controller of the suction device in a manner allowing signaling, or is part of the controller.

* * * * *